(12) United States Patent
Vesali et al.

(10) Patent No.: US 11,199,523 B2
(45) Date of Patent: Dec. 14, 2021

(54) SYSTEM AND METHOD FOR PANTOGRAPH FAULT MONITORING (71) Applicants: Farzad Vesali, Tehran (IR); Amir Bashari, Tehran (IR); Mina Kolagar, Tehran (IR)

(72) Inventors: Farzad Vesali, Tehran (IR); Amir Bashari, Tehran (IR); Mina Kolagar, Tehran (IR)

(73) Assignee: PISHRO EBTEKAR DANESH COMPANY (PED.CO), Tehran (IR)

( * ) Notice: Subject to any disclaimer, the term of this patent is extended or adjusted under 35 U.S.C. 154(b) by 279 days.

(21) Appl. No.: 16/565,627

(22) Filed: Sep. 10, 2019

(65) Prior Publication Data

US 2020/0001722 A1 Jan. 2, 2020

Related U.S. Application Data

(60) Provisional application No. 62/728,883, filed on Sep. 10, 2018.

(51) Int. Cl.
*G01N 29/04* (2006.01)
*B60L 5/24* (2006.01)
(Continued)

(52) U.S. Cl.
CPC .............. *G01N 29/045* (2013.01); *B60L 3/04* (2013.01); *B60L 5/24* (2013.01); *B60L 5/30* (2013.01);
(Continued)

(58) Field of Classification Search
CPC ...... B60L 5/24; B60L 3/04; B60L 5/30; B60L 9/00; B60L 2200/26; B60L 3/00; B60L 3/0092; B60L 3/06; B60L 3/12; B60L 5/12; B60L 5/16; B60L 5/26; B60L 5/28; H01R 41/00; G05B 1/00; G05B 1/01; G05B 1/02; G05B 6/00; G05B 6/02; G05B 23/00; G05B 23/02; G01R 23/00; G01V 1/30;
(Continued)

(56) References Cited

U.S. PATENT DOCUMENTS 3,538,756 A * 11/1970 Vernerd .................... B06B 1/16
73/578
7,873,518 B2 * 1/2011 Hentschel ............ G01N 29/045
704/256.1
(Continued)

FOREIGN PATENT DOCUMENTS

KR 20160068382 A * 6/2016 ............. G01N 29/46
WO WO-0216926 A1 * 2/2002 ............. G01N 29/46

*Primary Examiner* — Zachary L Kuhfuss
*Assistant Examiner* — Cheng Lin
(74) *Attorney, Agent, or Firm* — Bajwa IP Law Firm; Haris Zaheer Bajwa (57) ABSTRACT

A method for monitoring a pantograph. The method includes acquiring an impulse response of the pantograph, extracting a natural frequency and a damping coefficient of the pantograph from the impulse response, obtaining a similarity factor of a plurality of similarity factors, and detecting a fault in the pantograph from the plurality of fault types based on the plurality of the similarity factors. Acquiring an impulse response of the pantograph includes generating the impulse response by tapping the head of the pantograph and recording the impulse response utilizing a recording equipment.

20 Claims, 8 Drawing Sheets

(51) Int. Cl.
| | |
|---|---|
| *B60L 3/04* | (2006.01) |
| *B60L 9/00* | (2019.01) |
| *B60L 5/30* | (2006.01) |
| *G01N 29/36* | (2006.01) |
| *G01N 29/44* | (2006.01) |
| *G05B 23/00* | (2006.01) |
| *G01N 29/46* | (2006.01) |

(52) U.S. Cl.
CPC ............... *B60L 9/00* (2013.01); *G01N 29/04* (2013.01); *G01N 29/36* (2013.01); *G01N 29/44* (2013.01); *G01N 29/46* (2013.01); *G05B 23/00* (2013.01); *B60L 2200/26* (2013.01)

(58) Field of Classification Search
CPC .......... G01M 7/08; G01M 7/00; G01M 13/00; G01H 9/00; G01H 17/00; G01H 13/00; G01N 29/00; G01N 29/04; G01N 29/045; G01N 29/11; G01N 29/348; G01N 29/36; G01N 29/44; G01N 29/4436; G01N 29/46; G01N 2291/023; G01N 2291/0289
See application file for complete search history.

(56) References Cited

U.S. PATENT DOCUMENTS

| | | | |
|---|---|---|---|
| 8,494,790 B2 * | 7/2013 | Zhu | G01M 7/08 |
| | | | 702/56 |
| 9,061,594 B2 * | 6/2015 | Wesche | B60L 5/24 |
| 10,191,016 B2 * | 1/2019 | Hall | H04W 52/0216 |
| 10,351,150 B1 * | 7/2019 | Lederman | B61L 25/025 |
| 10,564,031 B1 * | 2/2020 | Stoia | B25J 9/1674 |
| 10,648,952 B2 * | 5/2020 | Cox | G01N 29/045 |
| 10,731,966 B2 * | 8/2020 | Pasquale | B60M 1/28 |
| 11,067,973 B2 * | 7/2021 | Ogata | G05B 23/0267 |
| 2012/0203474 A1 * | 8/2012 | Kawiecki | G01N 29/07 |
| | | | 702/39 |
| 2015/0308927 A1 * | 10/2015 | Kono | B61L 23/042 |
| | | | 702/182 |
| 2016/0034422 A1 * | 2/2016 | Brandt | G01N 29/4454 |
| | | | 708/424 |

\* cited by examiner

SYSTEM AND METHOD FOR PANTOGRAPH FAULT MONITORING

CROSS-REFERENCE TO RELATED APPLICATION

This application claims the benefit of priority from U.S. Provisional Patent Application Ser. No. 62/728,883, filed on Sep. 10, 2018, and entitled "COMPREHENSIVE MONITORING SYSTEM FOR PANTOGRAPH AND CATENARY" which is incorporated herein by reference in its entirety.

TECHNICAL FIELD

The present disclosure generally relates to railway industry, and particularly, to a method and system for monitoring a pantograph.

BACKGROUND

A pantograph is an apparatus mounted on a roof of an electric train, electric bus, or tram to collect power through contact with an overhead catenary wire. Pantographs with overhead catenary wires are now a dominant form of current collection for modern electric trains. Therefore, a pantograph is a critical structure for safe operation of modern trains. Structural failure of a pantograph may cause serious problems.

A damaged pantograph may tear down an overhead catenary wire. Tearing down an overhead catenary wire may require costly and time-consuming repairs and may lead to a significant downtime. On the other hand, torn high-voltage overhead catenary wires may also pose danger to passengers and personnel nearby. Therefore, it may be critical to ensure that a pantograph is in a healthy working condition.

Currently, a pantograph structural health is inspected offline through a visual inspection system. A visual inspection system, utilizing a camera, takes images of a pantograph and uses image analysis algorithms to determine if there is any damage in the pantograph structure. A visual inspection system may find thickness changes in a pantograph and external defects of the pantograph structure. However, a visual inspection system may not effectively detect soldering joint failures, metal fatigues, internal damages, or damages located at its camera's blind spots. There is, therefore, a need for systems and methods to inspect a pantograph structure that save labor cost and improve efficiency and accuracy of a pantograph inspection process.

SUMMARY

This summary is intended to provide an overview of the subject matter of the present disclosure and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes an exemplary method for fault diagnosis in a pantograph. An exemplary method may include acquiring an impulse response of the pantograph, extracting, utilizing one or more processors, a natural frequency and a damping coefficient from the impulse response, obtaining a similarity factor of a plurality of similarity factors, and detecting a fault in the pantograph from the plurality of fault types based on the plurality of the similarity factors, the fault associated with a largest similarity factor among the plurality of the similarity factors. In an exemplary embodiment, acquiring an impulse response of the pantograph may be implemented through triggering a head of the pantograph utilizing a trigger and obtaining the impulse response function of the triggered head of the pantograph utilizing a recording equipment;

In an exemplary embodiment, the natural frequency and the damping coefficient may be associated with the pantograph. In an exemplary embodiment, obtaining the similarity factor of a plurality of similarity factors may be done through obtaining, utilizing one or more processors, a difference between a value of the natural frequency and a value of a predetermined frequency of a plurality of predetermined frequencies and obtaining, utilizing one or more processors, a difference between a value of the damping coefficient and a value of a predetermined coefficient of a plurality of predetermined coefficients. In an exemplary embodiment, the predetermined coefficient may be associated with the predetermined frequency. In an exemplary embodiment, the predetermined frequency and the predetermined coefficient may be associated with a fault type of a plurality of fault types.

In an exemplary embodiment, acquiring an impulse response of the pantograph may include generating the impulse response by tapping the head of the pantograph and recording the impulse response utilizing a recording equipment. In an exemplary embodiment, tapping the head of the pantograph may include tapping the head of the pantograph with a trigger positioned in an initial position by hitting the trigger with the pantograph.

In an exemplary embodiment, hitting the trigger with the pantograph may include hitting an inclined bottom surface of a protruded part of the trigger with the pantograph.

In an exemplary embodiment, hitting the trigger with the pantograph may include placing the trigger on a trajectory associated with the pantograph and raising up the pantograph from a roof of an electrical train up to a position of the trigger through the trajectory.

In an exemplary embodiment, placing the trigger on the trajectory may include positioning the trigger above the roof of the electrified train in a position in the trajectory and Connecting the trigger to the roof of the electrified train.

In an exemplary embodiment, the exemplary method may further include returning the trigger from a secondary position to the initial position utilizing a spring connected to the trigger. In an exemplary embodiment, the trigger may be displaced to the secondary position responsive to hitting the trigger with the pantograph.

In an exemplary embodiment, obtaining the similarity factor may include assigning the similarity factor to the fault type. In an exemplary embodiment, the similarity factor may be associated with a sum of a difference between the value of the natural frequency and the value of the predetermined frequency and a difference between the value of the damping coefficient and the value of the predetermined coefficient.

In one general aspect, the present disclosure also describes an exemplary system for monitoring a pantograph. In an exemplary embodiment, the exemplary system may include a pantograph, a trigger mechanism, a memory, and a processor.

In an exemplary embodiment, the trigger mechanism may be configured to acquire an impulse response of the pantograph by triggering a head of the pantograph. In an exemplary embodiment, the memory may include processor-readable instructions stored therein.

In an exemplary embodiment, the processor may be configured to access the memory and execute the processor-readable instructions, which, when executed by the processor configures the processor to perform a method. In an exemplary embodiment, the method may include obtaining a similarity factor of a plurality of similarity factors, and detecting a fault in the pantograph from the plurality of fault types based on the plurality of the similarity factors, the fault associated with a largest similarity factor among the plurality of the similarity factors.

In an exemplary embodiment, the natural frequency and the damping coefficient may be associated with the pantograph. In an exemplary embodiment, obtaining the similarity factor of a plurality of similarity factors may be done through obtaining, utilizing one or more processors, a difference between a value of the natural frequency and a value of a predetermined frequency of a plurality of predetermined frequencies and obtaining, utilizing one or more processors, a difference between a value of the damping coefficient and a value of a predetermined coefficient of a plurality of predetermined coefficients. In an exemplary embodiment, the predetermined coefficient may be associated with the predetermined frequency. In an exemplary embodiment, the predetermined frequency and the predetermined coefficient may be associated with a fault type of a plurality of fault types.

In an exemplary embodiment, obtaining the similarity factor may include assigning the similarity factor to the fault type. In an exemplary embodiment, the similarity factor may be associated with a sum of a difference between the value of the natural frequency and the value of the predetermined frequency and a difference between the value of the damping coefficient and the value of the predetermined coefficient.

In an exemplary embodiment, the trigger may further be configured to generate the impulse response by tapping the head of the pantograph. In an exemplary embodiment, the system may further include a recording equipment configured to record the impulse response. In an exemplary embodiment, the pantograph may further be configured to hit the trigger mechanism in an initial position of the trigger mechanism.

Other exemplary systems, methods, features and advantages of the implementations will be, or will become, apparent to one of ordinary skill in the art upon examination of the following figures and detailed description. It is intended that all such additional systems, methods, features and advantages be included within this description and this summary, be within the scope of the implementations, and be protected by the claims herein.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown but is to be accorded the widest possible scope consistent with the principles and features disclosed herein.

Herein is disclosed exemplary methods and systems for monitoring a pantograph. A purpose of an exemplary method may include determining a fault type of a pantograph by comparing the behavior of the pantograph with that of predetermined pantographs with known faults. Accordingly, an exemplary method may include tapping the pantograph by an exemplary trigger to acquire an impulse response of the pantograph. Natural frequencies and damping coefficients of the pantograph may then be extracted from an acquired impulse response to be compared with predetermined sets of natural frequencies and damping coefficients. Exemplary predetermined sets of natural frequencies and damping coefficients may be acquired prior to fault diagnosis from different sound and faulty pantographs with known fault types. A set of natural frequencies and damping coefficients that may be similar to those extracted from the acquired impulse response may be selected and a fault type of a predetermined pantograph associated with the selected set may be determined as a fault type of the pantograph under examination.

Figure 1:
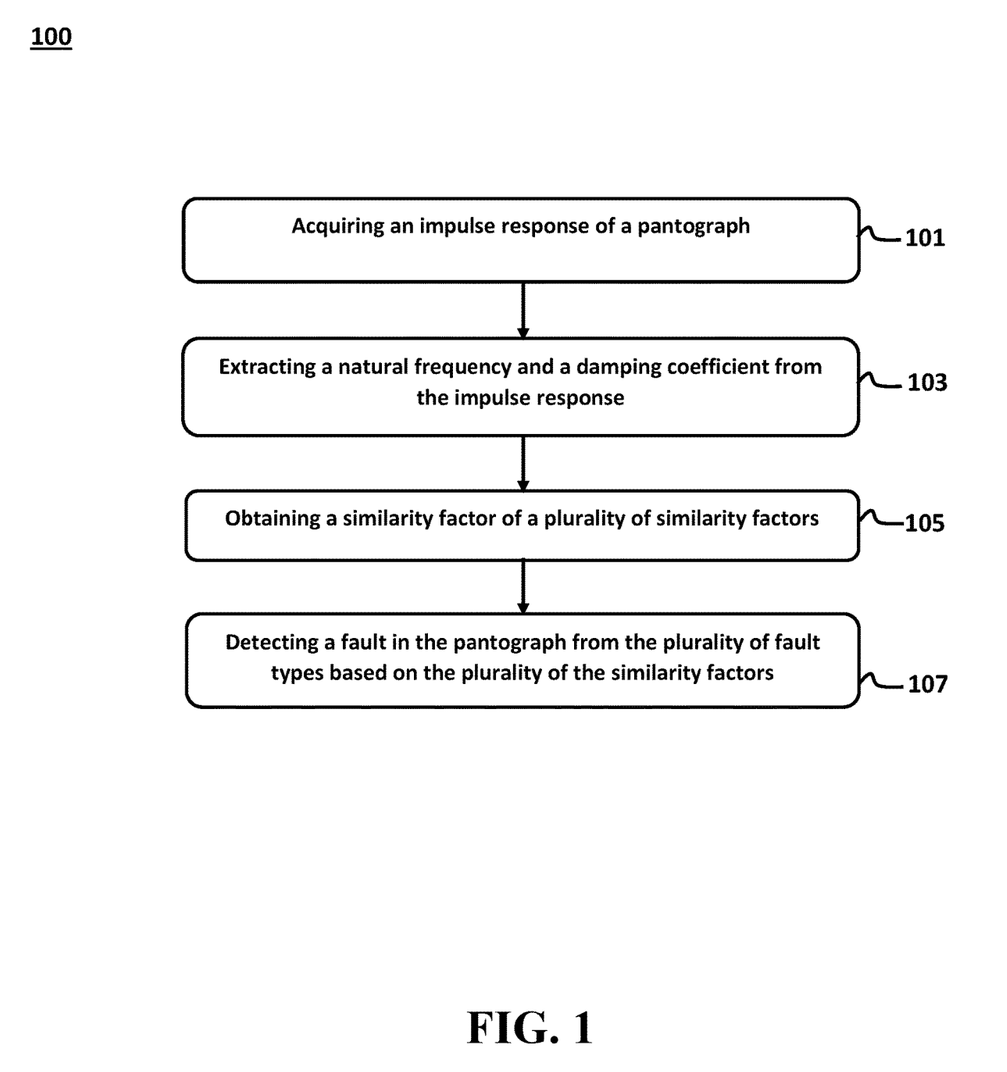
FIG. 1 illustrates a flowchart of a method for monitoring a pantograph, consistent with one or more exemplary embodiments of the present disclosure.

FIG. 1 shows a flowchart of a method for monitoring a pantograph, consistent with one or more exemplary embodiments of the present disclosure. As shown in FIG. 1, in an exemplary embodiment, an exemplary method 100 may include a step 101 of acquiring an impulse response of a pantograph by triggering a head of the pantograph. In an exemplary embodiment, acquiring an impulse response of the pantograph by triggering a head of the pantograph may include acquiring an impulse response of the pantograph by triggering a head of the pantograph when the pantograph is in a raised position. In an exemplary embodiment, acquiring an impulse response of the pantograph by triggering a head of the pantograph may include acquiring an impulse response of the pantograph by triggering a head of the pantograph when the pantograph is in an unraised position. In an exemplary embodiment, a raised position of a pantograph may refer to a position in which a head of the pantograph is raised up to be in contact with a contact wire of a catenary system and an unraised position of a pantograph may refer to a position in which a head of the pantograph is lowered down to not be in contact with a contact wire of a catenary system. When a pantograph is in a raised position, there may be an engagement between the pantograph and a catenary system, accordingly, when an impulse response is acquired from a pantograph in a raised position, the acquired impulse response may be an impulse response of the pantograph and a catenary system together. But when an impulse response is acquired from a pantograph in an unraised position, the acquired impulse response may be solely an impulse response of the pantograph. Due to the fact that an exact impulse response of a pantograph is needed for the pantograph fault monitoring, in an exemplary embodiment, in order to implement method 100, an impulse response may be acquired just from a pantograph in an unraised position.

Figure 2A:
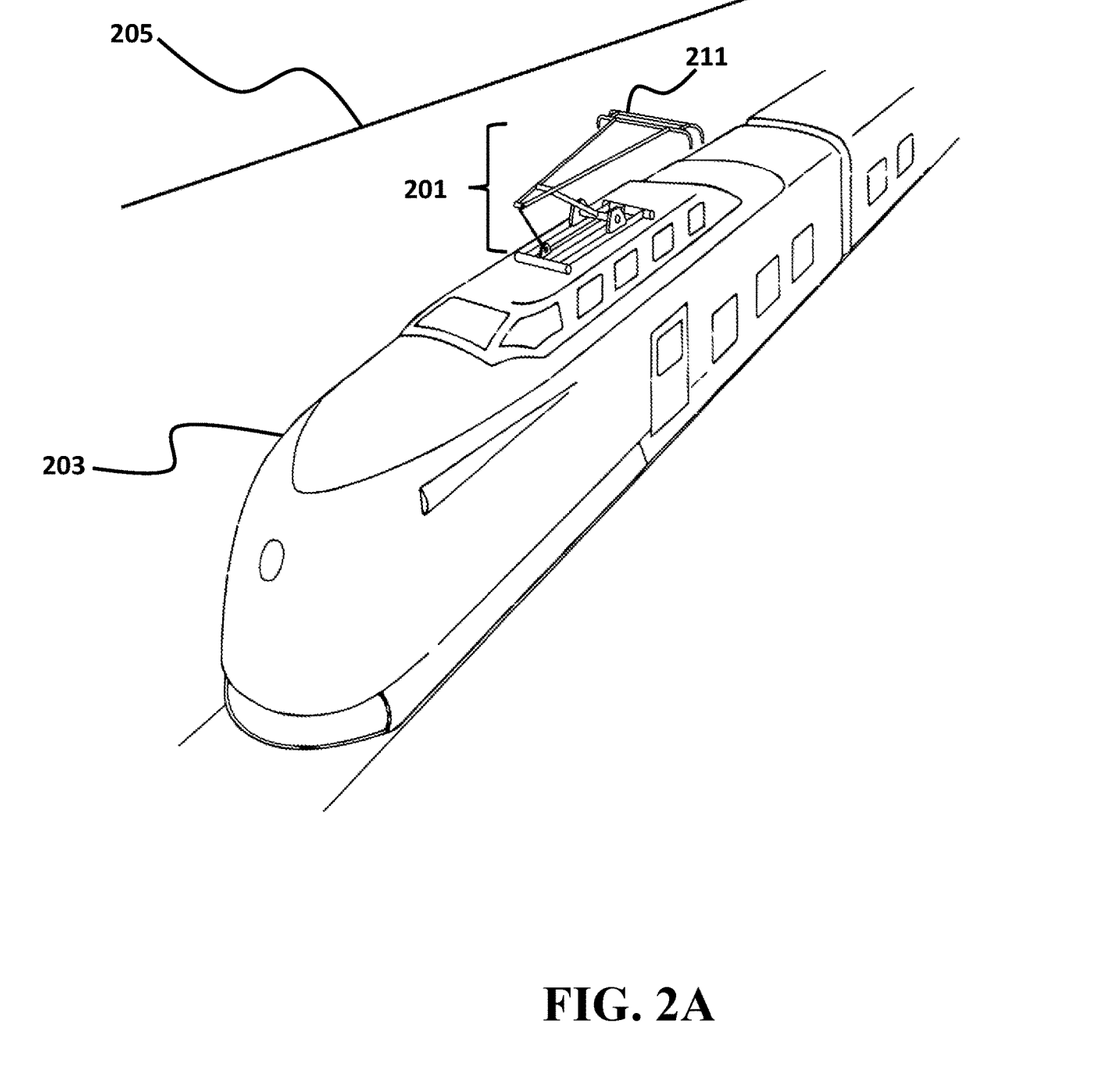
FIG. 2A illustrates a pantograph in an unraised position, consistent with one or more exemplary embodiments of the present disclosure.
Figure 2B:
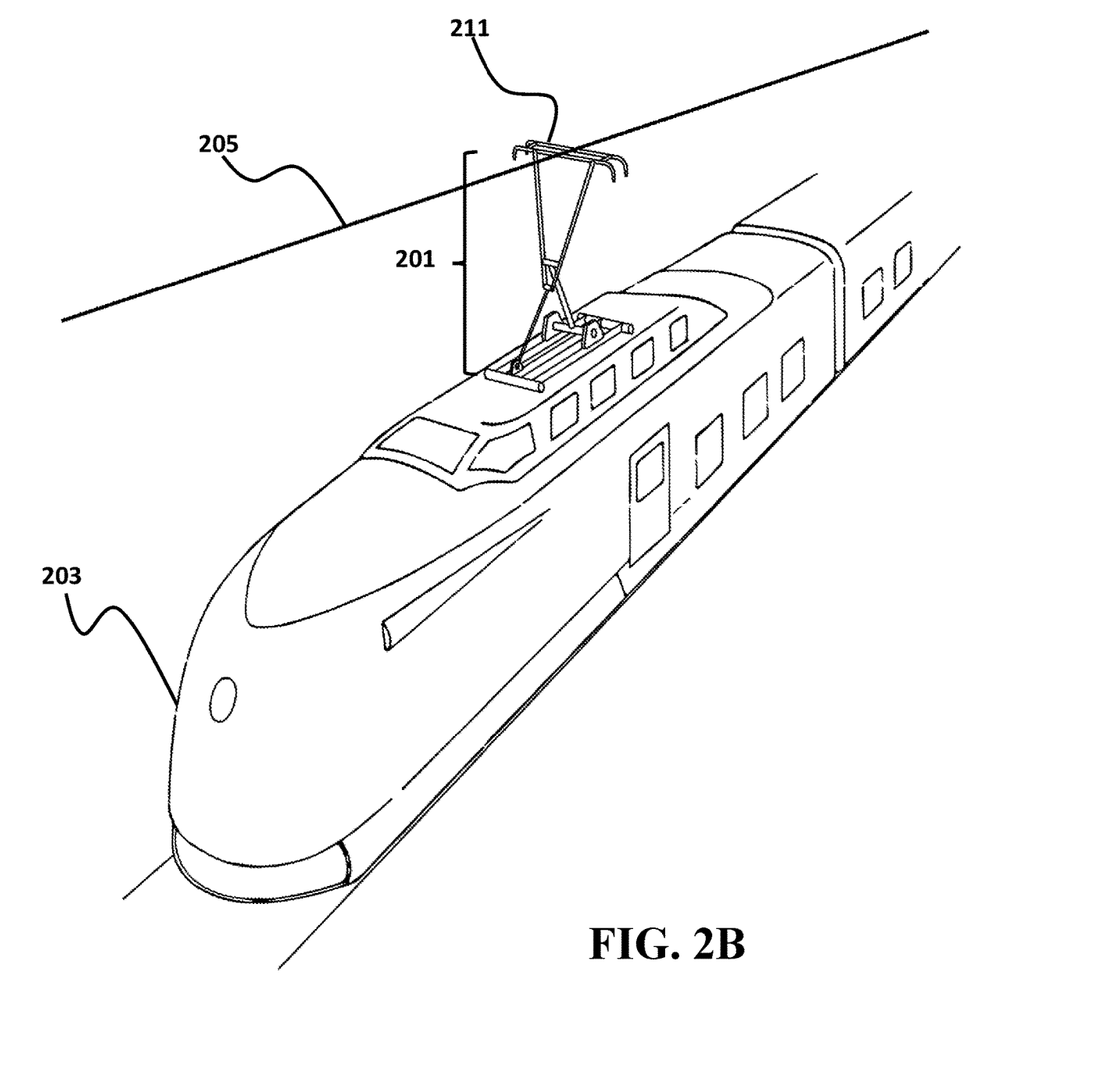
FIG. 2B illustrates a pantograph in a raised position, consistent with one or more exemplary embodiments of the present disclosure.

FIG. 2A shows a pantograph in an unraised position, consistent with one or more exemplary embodiments of the present disclosure. FIG. 2B shows a pantograph in a raised position, consistent with one or more exemplary embodiments of the present disclosure. In an exemplary embodiment, when a pantograph is in an unraised position, there may not be any contact between the pantograph and a catenary system and when a pantograph is in a raised position, there may be a contact between the pantograph and a catenary system through a contact wire. As shown in FIG. 2A and FIG. 2B, in an exemplary embodiment, a pantograph 201 may be mounted on a roof of a train 203. In an exemplary embodiment, pantograph 201 may include a head 211. In an exemplary embodiment, head 211 may be configured to collect power for pantograph 201 from a catenary system when head 211 is in contact with the catenary system. In an exemplary embodiment, when train 203 needs to collect power from a contact wire 205 of a catenary system, pantograph 201 may be raised up from an unraised position to a raised position to make a contact between head 211 and contact wire 205. In an exemplary embodiment, contact wire 205 may refer to a cable of a catenary system which may provide electrical power for train 203. For example, when train 203 is moving, pantograph 201 may be in a raised position as shown in FIG. 2B. In an exemplary embodiment, in order to implement step 101 of method 100, pantograph 201 may be in an unraised position as shown in FIG. 2A. Benefits from acquiring an impulse response of pantograph 201 when pantograph 201 is in an unraised position may include but not limited to acquiring a more accurate impulse response due to the fact that when pantograph 201 is in the raised position, a contact between head 211 and contact wire 205 may degrade accuracy of an acquired impulse response.

Figure 2C:
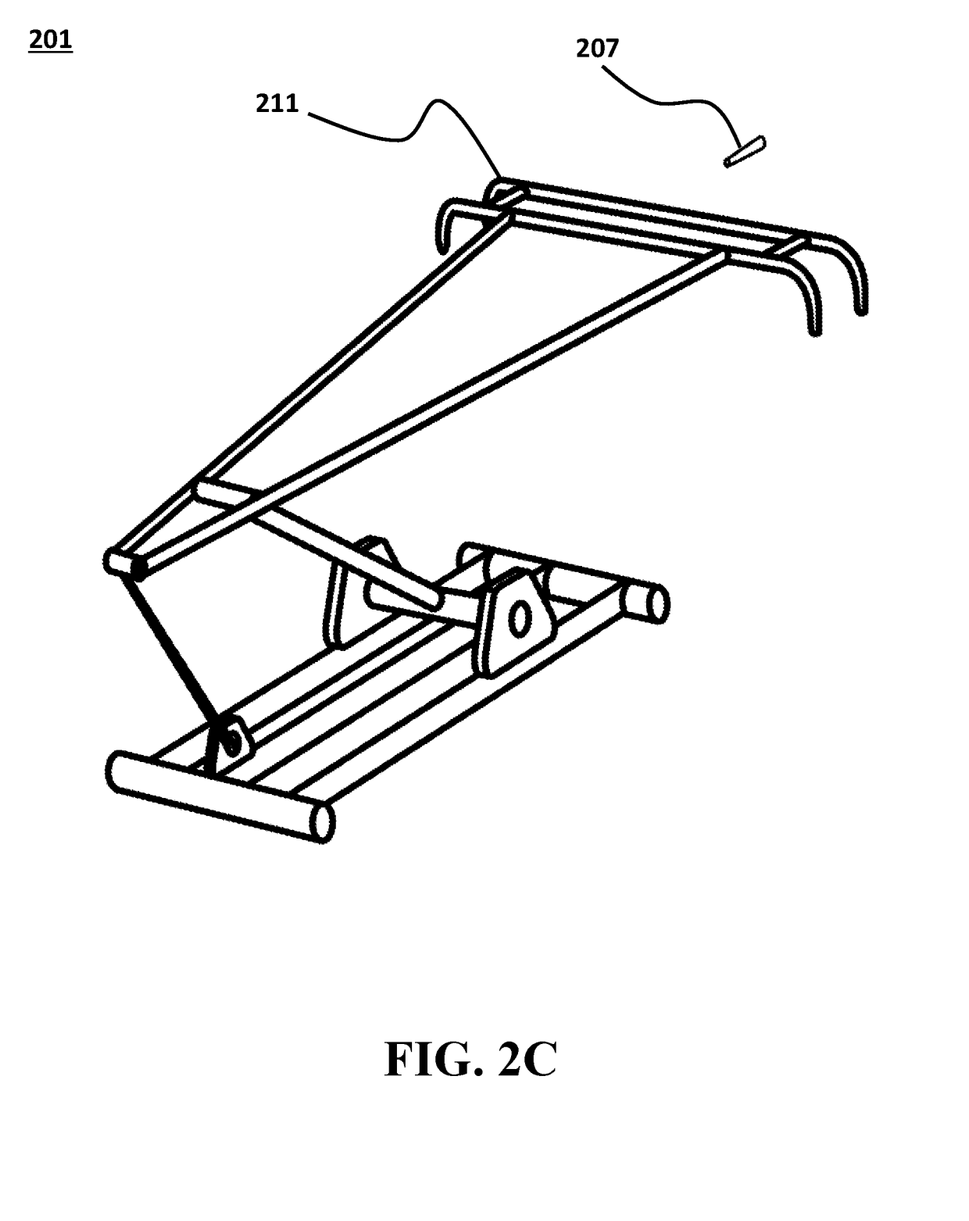
FIG. 2C illustrates a side view of a pantograph in the unraised position, consistent with one or more exemplary embodiments of the present disclosure.

In an exemplary embodiment, acquiring an impulse response of the pantograph by triggering a head of the pantograph may further include generating an impulse response by tapping a head of the pantograph and recording the impulse response utilizing a recording equipment. FIG. 2C shows a side view of a pantograph in an unraised position, consistent with one or more exemplary embodiments of the present disclosure. In an exemplary embodiment, in order to acquire an impulse response of pantograph 201, when pantograph 201 is in an unraised position, head 211 of pantograph 201 may be tapped by a nail 207 to generate an impulse response. In an exemplary embodiment, it may be understood that an impulse response may refer to a reaction of a dynamic system, such as pantograph 201, in response to an external change such as nail 207 tapping. Then, in an exemplary embodiment, the generated impulse response may be recorded utilizing a recording equipment. In fact, the "impulse response" or "impulse response function" of a dynamic system is its output when presented with a brief input signal, called an "impulse". More generally, an impulse response is a function that shows the reaction of any dynamic system in response to some external change. It may be understood that the impulse response may describe the reaction of a system as a function of time (or possibly as a function of some other independent variables that may parameterize the dynamic behavior of the system).

Figure 3:
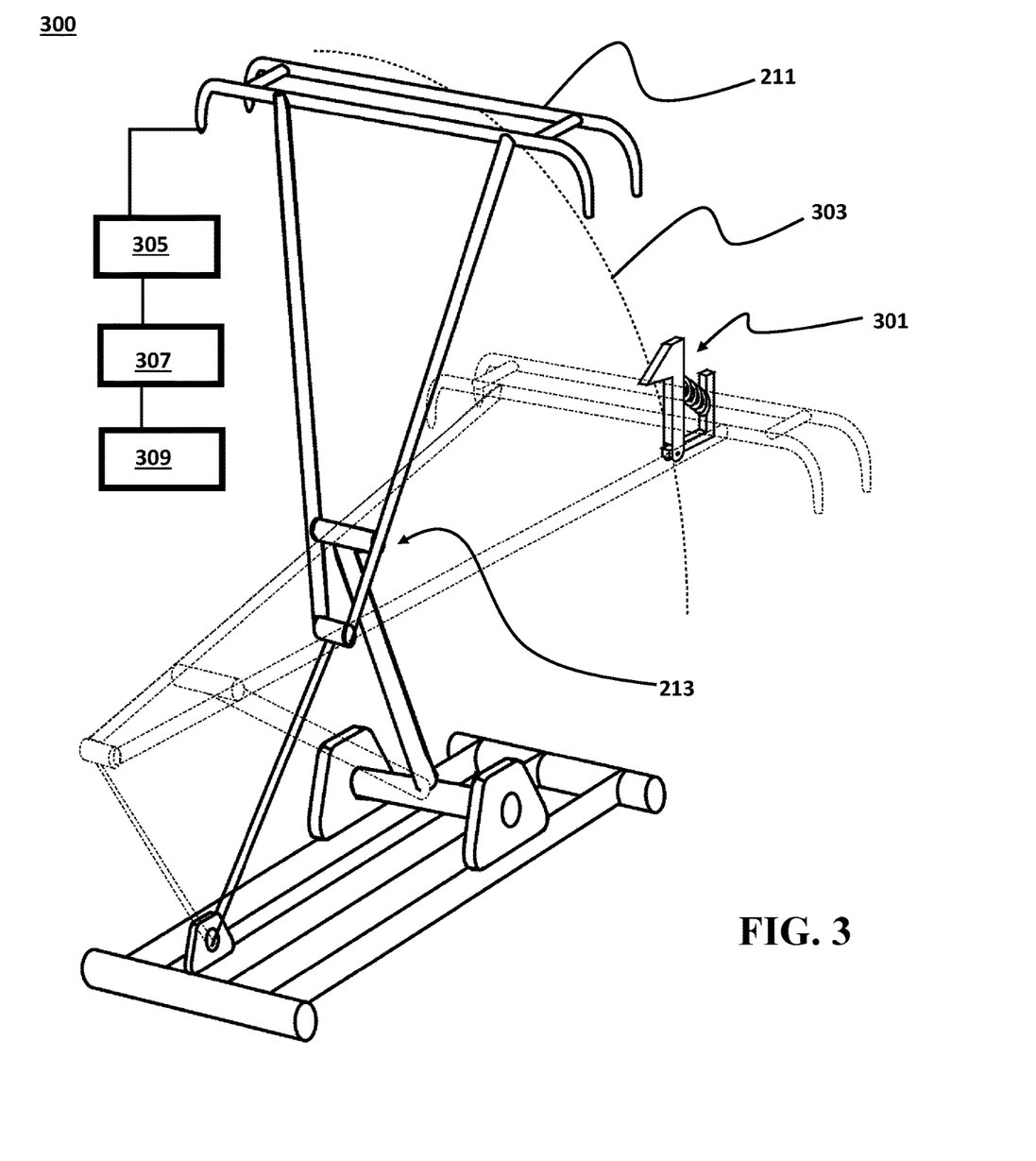
FIG. 3 illustrates a system for monitoring a pantograph, consistent with one or more exemplary embodiments of the present disclosure.

FIG. 3 shows a system 300 for monitoring a pantograph, consistent with one or more exemplary embodiments of the present disclosure. In an exemplary embodiment, different steps of method 100 may be implemented on system 300. As shown in FIG. 3, in an exemplary embodiment, system 300 may include a trigger mechanism 301. In an exemplary embodiment, trigger mechanism 301 may include a trigger 311.

As shown in FIG. 3, in an exemplary embodiment, pantograph 201 may include a raising mechanism 213. In an exemplary embodiment, raising mechanism 213 may be configured to raise up and/or lower down head 211 of pantograph 201.

In an exemplary embodiment, trigger mechanism 301 may be configured to be tapped by head 211 of pantograph 301 responsive to raising up or lowering down head 211 of pantograph 201. In an exemplary embodiment, trigger 311 of trigger mechanism 301 may be placed on a trajectory 303 associated with pantograph 301. In an exemplary embodiment, trajectory 303 may refer to a path through which head 211 pass to displace from an unraised position to a raised position or from a raised position to an unraised position (the dashed line showing pantograph 201 in an unraised position in FIG. 3). In an exemplary embodiment, when trigger 311 is placed on trajectory 303, responsive to raising up and/or lowering down pantograph 301, trigger 311 may be tapped by head 211 of pantograph 301. In an exemplary embodiment, responsive to trigger 311 is tapped by head 211 of pantograph 301, trigger mechanism 301 may displace from an initial position to a secondary position.

Figure 4A:
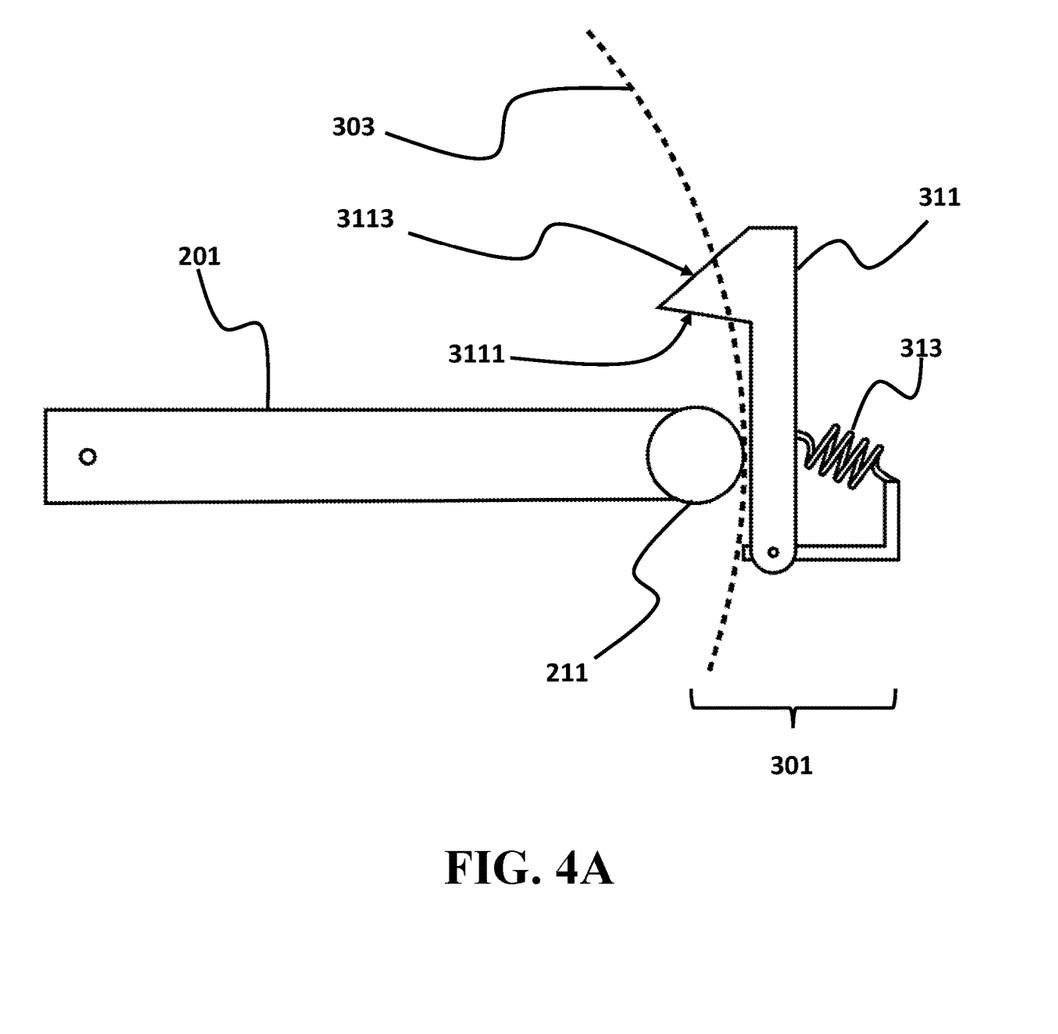
FIG. 4A illustrates a side view of an exemplary trigger mechanism when the exemplary trigger mechanism is in an initial position, consistent with one or more exemplary embodiments of the present disclosure.
Figure 4B:
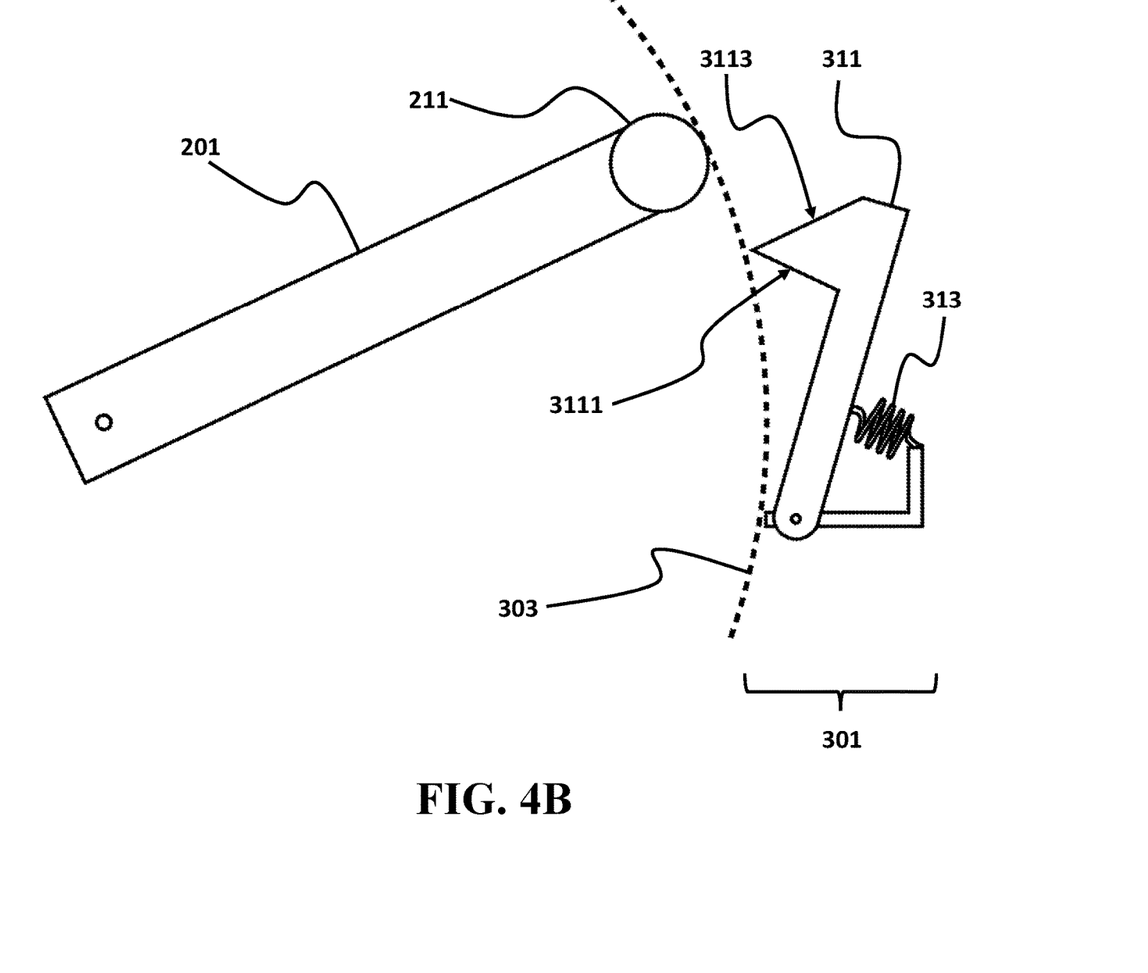
FIG. 4B illustrates a side view of an exemplary trigger mechanism when the exemplary trigger mechanism is in a secondary position, consistent with one or more exemplary embodiments of the present disclosure.

FIG. 4A shows a side view of an exemplary trigger mechanism when the exemplary trigger mechanism is in an initial position, consistent with one or more exemplary embodiments of the present disclosure. FIG. 4B shows a side view of an exemplary trigger mechanism when the exemplary trigger mechanism is in a secondary position, consistent with one or more exemplary embodiments of the present disclosure. As shown in FIG. 4A and FIG. 4B, in an exemplary embodiment, trigger 311 may include an inclined bottom surface 3111 and an inclined top surface 3113. In an exemplary embodiment, during raising up pantograph 201, when inclined bottom surface 3111 is tapped with head 211 of pantograph 201, trigger mechanism 301 may displace from an initial position to a secondary position. Also, in an exemplary embodiment, during lowering down pantograph 201, when inclined top surface 3113 is tapped with head 211 of pantograph 201, trigger mechanism 301 may displace from an initial position to a secondary position.

In an exemplary embodiment, trigger mechanism 301 may include a return spring 313 which may be connected to trigger 311. In an exemplary embodiment, return spring 313 may be configured to return trigger 311 from a secondary position to an initial position.

In an exemplary embodiment, during raising up pantograph 201, responsive to inclined bottom surface 3111 is tapped with head 211 of pantograph 201, trigger 311 may also tap head 211 of pantograph 201 and to thereby may generate an impulse response of pantograph 201. Also, in an exemplary embodiment, during lowering down pantograph 201, responsive to inclined top surface 3113 is tapped with head 211 of pantograph 201, trigger 311 may also tap head 211 of pantograph 201 and to thereby may generate an impulse response of pantograph 201.

In an exemplary embodiment, system 300 may further include a recording equipment 305 coupled with head 211 of pantograph 201. In an exemplary embodiment, recording equipment 305 may be configured to record an impulse response of pantograph 201.

Referring back to FIG. 1, in an exemplary embodiment, method 100 may further include a step 103 of extracting, utilizing one or more processors a natural frequency and a damping coefficient from the impulse response. In an exemplary embodiment, the natural frequency and the damping coefficient may be associated with the pantograph. In an exemplary embodiment, it may be understood that natural frequency and damping coefficient are two physical characteristics of an object which may be extracted from an impulse response of the object. As said before, the impulse response is a function. In an exemplary embodiment, the natural frequency and the damping coefficient may be extracted from an equation of the impulse response function. It may be understood that, some known software and programs may be utilized to extract a natural frequency and a damping coefficient of a system by inserting them an impulse response function of the intended system.

In an exemplary embodiment, method 100 may further include a step 105 of obtaining a similarity factor of a plurality of similarity factors. In an exemplary embodiment, each similarity factor of the plurality of similarity factors may be associated with a fault type from a plurality of fault types associated with pantograph 201. In an exemplary embodiment, the similarity factor may be associated with a sum of a difference between the value of the natural frequency and the value of the predetermined frequency and a difference between the value of the damping coefficient and the value of the predetermined coefficient. In an exemplary embodiment, obtaining a similarity factor of a plurality of similarity factors may include calculating, utilizing one or more processors, a difference between a value of the natural frequency with a value of a predetermined frequency of a plurality of predetermined frequencies, calculating, utilizing one or more processors, a difference between a value of the damping coefficient with a value of a predetermined coefficient of a plurality of predetermined coefficients, and calculating a similarity factor of the fault type based on an operation defined by the following:

$$\text{similarity factor} = \frac{1}{\text{first difference} + \text{second difference}}.$$

In an exemplary embodiment, the predetermined frequency may be associated with the predetermined coefficient. In an exemplary embodiment, the predetermined frequency and the predetermined coefficient may be associated with a fault type from a plurality of fault types in pantograph 201.

In an exemplary embodiment, method 100 may further include a step 107 of determining a fault in the pantograph by selecting one of the plurality of fault types associated with a largest similarity factor among the plurality of the similarity factors.

As shown in FIG. 3, in an exemplary embodiment, system 300 may further include a memory 307 and a processor 309. In an exemplary embodiment, memory 307 may have processor-readable instructions stored therein. In an exemplary embodiment, processor 309 may be configured to access memory 307 and execute the processor-readable instructions. In an exemplary embodiment, when the processor-readable instructions are executed by processor 309, the processor-readable instructions may configure processor 309 to perform extracting a natural frequency and a damping coefficient from the impulse response, obtaining a similarity factor of a plurality of similarity factors, and determining a fault in the pantograph by selecting one of the plurality of fault types associated with a largest similarity factor among the plurality of the similarity factors.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Figure 5:
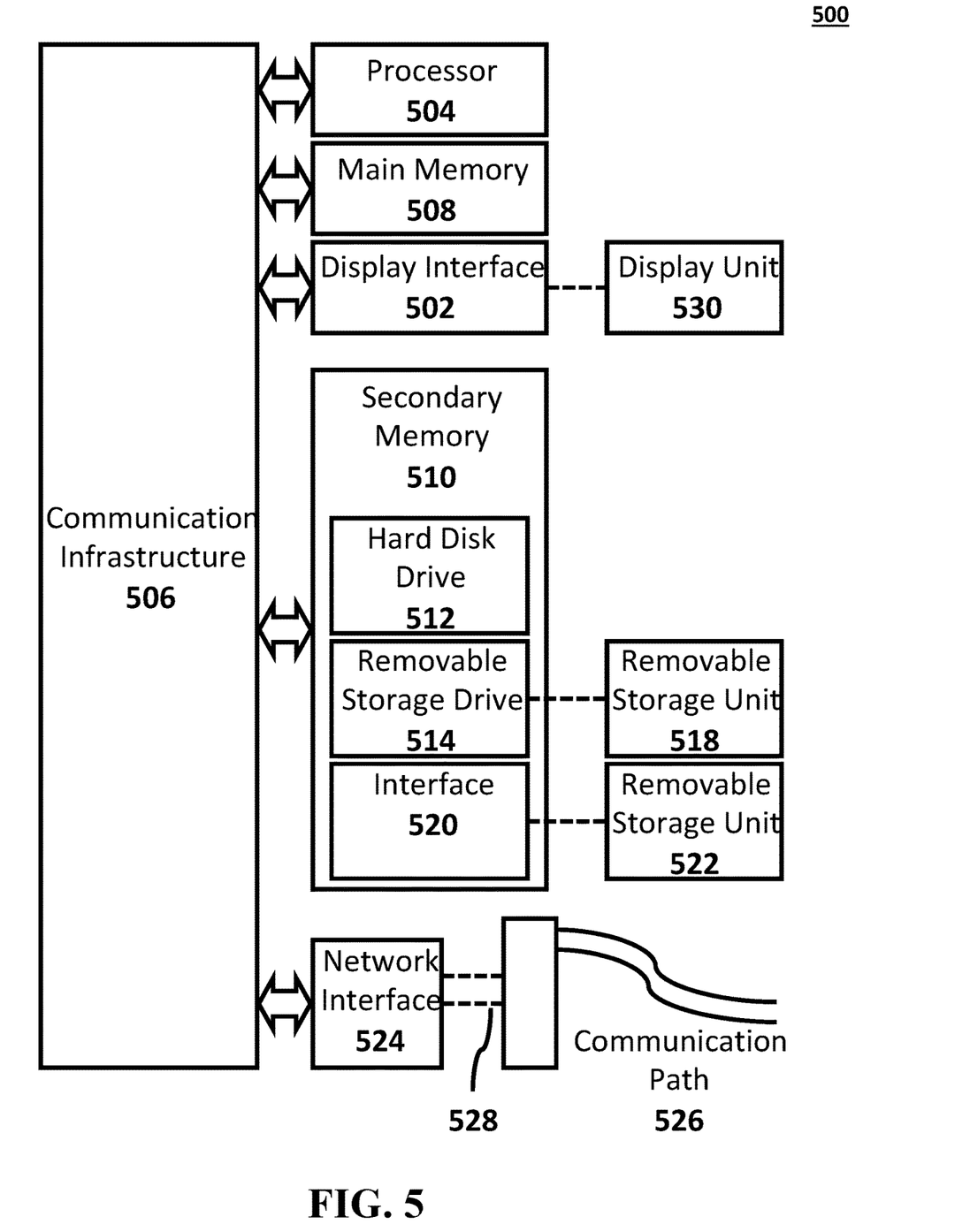
FIG. 5 illustrates an example computer system in which an embodiment of the present disclosure, or portions thereof, may be implemented as computer-readable code, consistent with exemplary embodiments of the present disclosure.

FIG. 5 shows an example computer system 500 in which an embodiment of the present disclosure, or portions thereof, may be implemented as computer-readable code, consistent with exemplary embodiments of the present disclosure. For example, memory 307 or processor 309 may be implemented in computer system 500 using hardware, software, firmware, tangible computer readable media having instructions stored thereon, or a combination thereof and may be implemented in one or more computer systems or other processing systems. Hardware, software, or any combination of such may embody any of the modules and components in FIGS. 1A-4B.

If programmable logic is used, such logic may execute on a commercially available processing platform or a special purpose device. One ordinary skill in the art may appreciate that an embodiment of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

An embodiment of the disclosure is described in terms of this example computer system 500. After reading this description, it will become apparent to a person skilled in the relevant art how to implement the disclosure using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 504 may be a special purpose or a general-purpose processor device. As will be appreciated by persons skilled in the relevant art, processor device 504 may also be a single processor in a multi-core/multiprocessor system, such system operating alone, or in a cluster of computing devices operating in a cluster or server farm. Processor device 504 may be connected to a communication infrastructure 506, for example, a bus, message queue, network, or multi-core message-passing scheme.

In an exemplary embodiment, computer system 500 may include a display interface 502, for example a video connector, to transfer data to a display unit 530, for example, a monitor. Computer system 500 may also include a main memory 508, for example, random access memory (RAM), and may also include a secondary memory 510. Secondary memory 510 may include, for example, a hard disk drive 512, and a removable storage drive 514. Removable storage drive 514 may include a floppy disk drive, a magnetic tape drive, an optical disk drive, a flash memory, or the like. Removable storage drive 514 may read from and/or write to a removable storage unit 518 in a well-known manner. Removable storage unit 518 may include a floppy disk, a magnetic tape, an optical disk, etc., which may be read by and written to by removable storage drive 514. As will be appreciated by persons skilled in the relevant art, removable storage unit 518 may include a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 may be in the form of signals, which may be electronic, electromagnetic, optical, or other signals capable of being received by communications interface 524. These signals may be provided to communications interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Computer program medium and computer usable medium may also refer to memories, such as main memory 508 and secondary memory 510, which may be memory semiconductors (e.g. DRAMs, etc.).

Computer programs (also called computer control logic) are stored in main memory 508 and/or secondary memory 510. Computer programs may also be received via communications interface 524. Such computer programs, when executed, enable computer system 500 to implement different embodiments of the present disclosure as discussed herein. In particular, the computer programs, when executed, enable processor device 504 to implement the processes of the present disclosure, such as the operations in method 100 illustrated by flowchart 100 of FIG. 1 discussed above. Accordingly, such computer programs represent controllers of computer system 500. Where an exemplary embodiment of method 100 is implemented using software, the software may be stored in a computer program product and loaded into computer system 500 using removable storage drive 514, interface 520, and hard disk drive 512, or communications interface 524.

Embodiments of the present disclosure also may be directed to computer program products including software stored on any computer useable medium. Such software, when executed in one or more data processing device, causes a data processing device to operate as described herein. An embodiment of the present disclosure may employ any computer useable or readable medium. Examples of computer useable mediums include, but are not limited to, primary storage devices (e.g., any type of random access memory), secondary storage devices (e.g., hard drives, floppy disks, CD ROMs, ZIP disks, tapes, magnetic storage devices, and optical storage devices, MEMS, nano-technological storage device, etc.).

EXAMPLE

For example, pantograph 201 may be associated with five faults types as follow: a first fault type of "abnormal spring box friction", a second fault type of "abnormal damper efficiency", a third fault type of "increased collector mass", a fourth fault type of "blocked collector suspension", and a fifth fault type of "wrong static preload".

For example, in an exemplary embodiment, when pantograph 201 has the first fault type, a value of a first predetermined frequency from the plurality of predetermined frequency may be equal to 2.63 Hz and a value of a first predetermined coefficient from the plurality of predetermined coefficients may be equal to 31.2%.

In an exemplary embodiment, when pantograph 201 has the second fault type, a value of a second predetermined frequency from the plurality of predetermined frequencies may be equal to 28.33 Hz and a value of a second predetermined coefficient from the plurality of predetermined coefficients may be equal to 7.5%.

In an exemplary embodiment, when pantograph 201 has the third fault type, a value of a third predetermined frequency from the plurality of predetermined frequencies may be equal to 36.65 Hz and a value of a third predetermined coefficient from the plurality of predetermined coefficients may be equal to 4.5%.

In an exemplary embodiment, when pantograph 201 has the fourth fault type, a value of a fourth predetermined frequency from the plurality of predetermined frequencies may be equal to 63.6 Hz and a value of a fourth predetermined coefficient from the plurality of predetermined coefficients may be equal to 0.86%.

In an exemplary embodiment, when pantograph 201 has the fifth fault type, a value of a fifth predetermined frequency from the plurality of predetermined frequencies may be equal to 66.5 Hz and a value of a fifth predetermined coefficient from the plurality of predetermined coefficients may be equal to 0.73%.

In an exemplary embodiment, an impulse response of pantograph 201 may be acquired by triggering head 211 of pantograph 201 and may be recorded by a recording equipment. Then the natural frequency and the damping coefficient may be extracted from the acquired impulse response function. In an exemplary embodiment, some known software and programs may be utilized to extract the natural frequency and the damping coefficient. These software and programs may receive an impulse response function of pantograph 201 as input and deliver the natural frequency and the damping coefficient as output.

In an exemplary embodiment, in order to implement step 105 of method 100, after extracting the natural frequency and the damping coefficient from the impulse response, the first difference and the second difference may be calculated for each of plurality of fault types.

In an exemplary embodiment, method 100 may further include a step 107 of determining a fault in the pantograph by selecting one of the plurality of fault types associated with a largest similarity factor among the plurality of the similarity factors. Further details with respect to step 107 may be gleamed from the example provided below.

In an exemplary embodiment, a value of the natural frequency of pantograph 201 and a value of the damping coefficient of pantograph 201 may be respectively equal to 36 Hz and 4%. Accordingly, the first difference for the first fault type, the second fault type, the third fault type, the fourth fault type, and the fifth fault type may respectively be equal to 33.37, 7.67, 0.65, 26.4, and 28.3. Similarly, the second difference for the first fault type, the second fault type, the third fault type, the fourth fault type, and the fifth fault type may respectively be equal to 27.2, 3.5, 0.5, 3.17, and 3.27.

In an exemplary embodiment, the similarity factor for a fault type may be calculated as follow:

$$\text{similarity factor} = \frac{1}{\text{first difference} + \text{second difference}}$$

Then, the similarity factor for the first fault type, the second fault type, the third fault type, the fourth fault type, and the fifth fault type may respectively be equal to 0.0165, 0.0895, 0.869, 0.0338, and 0.0316.

In an exemplary embodiment, in order to implement step 107 of method 100, as 0.869 is the largest similarity factor between each of the plurality of similarity factors, the third fault type may be determined as the fault of pantograph 201.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

While the foregoing has described what may be considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A method for monitoring a pantograph, the method comprising:
    acquiring an impulse response of the pantograph by:
        triggering a head of the pantograph utilizing a trigger; and
        obtaining the impulse response function of the triggered head of the pantograph utilizing a recording equipment;
    extracting, utilizing one or more processors, a natural frequency and a damping coefficient from the impulse response, the natural frequency and the damping coefficient associated with the pantograph;
    obtaining a similarity factor of a plurality of similarity factors, each similarity factor of the plurality of similarity factors associated with a respective fault type from a plurality of fault types associated with the pantograph, comprising:
        obtaining, utilizing one or more processors, a first difference between a value of the natural frequency and a value of a predetermined frequency of a plurality of predetermined frequencies, the predetermined frequency associated with the respective fault type;
        obtaining, utilizing one or more processors, a second difference between a value of the damping coefficient and a value of a predetermined coefficient of a plurality of predetermined coefficients, the predetermined coefficient associated with the predetermined frequency, the predetermined coefficient associated with the respective fault type; and
        calculating a similarity factor of the fault type based on the first difference and the second difference according to an operation defined by the following:

$$\text{similarity factor} = \frac{1}{\text{first difference} + \text{second difference}};$$

and
    detecting a fault in the pantograph from the plurality of fault types based on the plurality of the similarity factors, the fault associated with a largest similarity factor among the plurality of the similarity factors.

2. The method of claim 1, wherein acquiring the impulse response of the pantograph comprises:
    generating the impulse response by tapping the head of the pantograph; and
    recording the impulse response function utilizing the recording equipment.

3. The method of claim 2, wherein tapping the head of the pantograph comprises tapping the head of the pantograph with a trigger mechanism positioned in an initial position by hitting the trigger mechanism with the pantograph.

4. The method of claim 3, wherein hitting the trigger mechanism with the pantograph comprises hitting an inclined bottom surface of a trigger of the trigger mechanism with the pantograph.

5. The method of claim 4, wherein hitting the inclined bottom surface of the trigger comprises:
    placing the trigger on a trajectory associated with the pantograph; and
    raising up the pantograph from a roof of an electrical train up to a position of the trigger through the trajectory.

6. The method of claim 5, wherein placing the trigger on the trajectory comprises:
    positioning the trigger above the roof of the electrified train and in the initial position in the trajectory; and
    connecting the trigger to the roof of the electrified train.

7. The method of claim 6, further comprising returning the trigger from a secondary position to the initial position utilizing a return spring connected to the trigger, the trigger displaced to the secondary position responsive to hitting the trigger with the pantograph.

8. The method of claim 1, wherein obtaining the similarity factor comprises assigning the similarity factor to the fault type, the similarity factor associated with a sum of a difference between the value of the natural frequency and the value of the predetermined frequency and a difference between the value of the damping coefficient and the value of the predetermined coefficient.

9. A system for pantograph fault monitoring, the system comprising:
    a pantograph;
    a trigger mechanism configured to acquire an impulse response of the pantograph by triggering a head of the pantograph;
    a memory having processor-readable instructions stored therein; and
    a processor configured to access the memory and execute the processor-readable instructions, which, when executed by the processor configures the processor to perform a method, the method comprising:
        extracting, utilizing one or more processors, a natural frequency and a damping coefficient from the impulse response, the natural frequency and the damping coefficient associated with the pantograph;
        obtaining a similarity factor of a plurality of similarity factors, each similarity factor of the plurality of similarity factors associated with a respective fault type from a plurality of fault types associated with the pantograph, comprising:
            obtaining a first difference between a value of the natural frequency and a value of a predetermined frequency of a plurality of predetermined frequencies; the predetermined frequency associated with the respective fault type
            obtaining a second difference between a value of the damping coefficient and a value of a predetermined coefficient of a plurality of predetermined coefficients, the predetermined coefficient associated with the predetermined frequency; the predetermined coefficient associated with the respective fault type; and calculating a similarity factor of the fault type based on the first difference and the second difference according to an operation defined by the following:

$$\text{similarity factor} = \frac{1}{\text{first difference} + \text{second difference}};$$

and detecting a fault in the pantograph from the plurality of fault types based on the plurality of the similarity factors, the fault associated with a largest similarity factor among the plurality of the similarity factors.

10. The system of claim 9, wherein the trigger mechanism is further configured to generate the impulse response by tapping the head of the pantograph.

11. The system of claim 9, further comprising a recording equipment configured to record the impulse response function.

12. The system of claim 10, wherein the pantograph is configured to hit the trigger mechanism in an initial position of the trigger mechanism.

13. The system of claim 12, wherein the trigger mechanism comprises a trigger comprising an inclined bottom surface.

14. The system of claim 13, wherein the pantograph is further configured to hit the inclined bottom surface.

15. The system of claim 14, wherein the trigger is placed on a trajectory associated with the pantograph.

16. The system of claim 15, wherein the pantograph is further configured to rise up from a roof of an electrical train up to a position of the trigger through the trajectory.

17. The system of claim 16, wherein the trigger:
is positioned above the roof of the electrified train in a position in the trajectory; and
is connected to the roof of the electrified train.

18. The system of claim 12, wherein the trigger is further configured to be displaced to a secondary position responsive to the pantograph hitting the trigger in the initial position.

19. The system of claim 18, further comprising a return spring connected to the trigger, the return spring configured to return the trigger from the secondary position to the initial position.

20. The system of claim 9, wherein obtaining the similarity factor comprises assigning the similarity factor to the fault type, the similarity factor associated with a sum of a difference between the value of the natural frequency and the value of the predetermined frequency and a difference between the value of the damping coefficient and the value of the predetermined coefficient.

* * * * *